United States Patent [19]
Zannucci et al.

[11] 3,900,442
[45] Aug. 19, 1975

[54] TITANIUM DIOXIDE PIGMENTED POLYMER COMPOSITIONS WITH IMPROVED VISIBLE AND ULTRAVIOLET LIGHT STABILITY

[75] Inventors: Joseph S. Zannucci; Gerald R. Lappin, both of Kingsport, Tenn.

[73] Assignee: Eastman Kodak Company, Rochester, N.Y.

[22] Filed: Apr. 30, 1974

[21] Appl. No.: 465,470

Related U.S. Application Data

[63] Continuation of Ser. No. 394,369, Sept. 4, 1973, abandoned.

[52] U.S. Cl........ 260/42.46; 260/45.75 R; 260/878
[51] Int. Cl.² .................. C08K 5/13; C08K 5/27
[58] Field of Search ................ 260/45.75 R, 42.46

[56] References Cited
UNITED STATES PATENTS

| | | | |
|---|---|---|---|
| 3,004,896 | 10/1961 | Heller | 424/226 |
| 3,189,630 | 6/1965 | Smutny | 260/448 R |
| 3,368,997 | 2/1968 | Gordon | 260/45.8 NT |
| 3,549,588 | 12/1970 | Kopacki | 260/45.7 PS |
| 3,644,217 | 2/1972 | Cyba | 260/45.7 R |
| 3,658,910 | 4/1972 | Hechenbleikner | 260/45.95 F |

OTHER PUBLICATIONS

Modern Plastics Encyclopedia for 1968, September 1967, Vol. 45, No. 1A, p. 497.

*Primary Examiner*—Paul R. Michl

[57] ABSTRACT

The zinc or manganese salt of 3,5-di-tert-alkyl-4-hydroxybenzoic acid, in combination with either a 2-hydroxybenzophenone or a 2-(2H-benzotriazol-2-yl)phenol ultraviolet absorber, provides a highly effective synergistic stabilizer system for $TiO_2$-pigmented polymers.

9 Claims, No Drawings

TITANIUM DIOXIDE PIGMENTED POLYMER COMPOSITIONS WITH IMPROVED VISIBLE AND ULTRAVIOLET LIGHT STABILITY

This application is a continuation of U.S. application Ser. No. 394,369, filed Sept. 4, 1973 now abandoned.

This invention relates to the stabilization of polymer compositions, and more particularly to the stabilization of titanium dioxide-pigmented polymer compositions against deterioration of physical properties resulting from exposure to sunlight or ultraviolet light.

Thermal plastic compositions such as polypropylene have found wide acceptance as useful materials for making foils, films, fibers and molded articles. These articles are inherently strong, can be made dimensionally stable or sufficiently flexible to suit the requirements of their intended use, and are relatively inert to common household cleansing agents and solvents. However, such articles are unfortunately subject to rapid and severe degradation and deterioration, as evidenced by changes in the physical properties of the polymers, due to the effects of light, and particularly ultraviolet light. Such photodegradation is particularly evidenced by surface cracking, increased brittleness, loss of dielectric properties and discoloration of the polymer. Polymer compositions which contain titanium dioxide pigment are frequently even more difficult to stabilize against photodegradation by sunlight. This pigment renders some polymers more susceptible to photodegradation than is the unpigmented polymer. In polyolefins, titanium dioxide may either stablilize or destabilize the polymer, the effect observed depending on the concentration of pigment and the test conditions. The addition of the usual ultraviolet absorbers to such formulations generally provides little or no enhancement of this photostability. The compositions of this invention contain highly effective synergistic stabilizer formulations for titanium dioxide-pigmented polymers.

According to one embodiment of this invention there is provided a titanium dioxide-pigmented polyolefin normally susceptible to degradation due to visible or ultraviolet light mixed with a stabilizing amount of the following components 1 and 2 as follows:

1. a compound having the formula

I 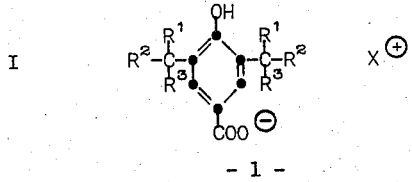

- 1 - wherein $R^1$ to $R^3$ are the same or different and each represents an alkyl group having 1 to 8 carbon atoms; $X^+$ is $Mn^{+2}$ or $Zn^{+2}$; and 2. a compound selected from (a) compounds having the formula:

II 

or (b) compounds of the formula:

III 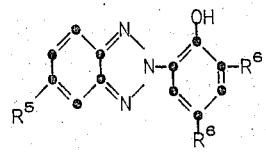

wherein each $R^4$ is the same or different and represents hydrogen or alkyl, $R^5$ represents hydrogen or chloro, and each $R^6$ is the same or different and represents hydrogen or alkyl, each of said components being utilized in an amount of from about 0.01 to about 5.0 weight percent based on the polymer with an upper limit such that the sum of all such percentages of said components does not exceed 5 percent based on the weight of the polymer.

In a preferred embodiment of this invention of the titanium dioxidde-pigmented polymer is a polyolefin such as polypropylene or a polypropylene graft acrylic acid as described in McConnell et al. U.S. application Ser. No. 336,155 entitled "Polypropylene/Acrylic Acid Graft Copolymers," filed Feb. 26, 1973, which is a continuation-in-part of U.S. application Ser. No. 258,794, filed June 1, 1972; each of $R^1$ to $R^3$ is an alkyl group of 1 to 2 carbon atoms; $X^+$ is $Zn^{+2}$ or $Mn^{+2}$; $R^4$ is an alkyl group of 8 to 12 carbon atoms; $R^5$ is hydrogen or chloro; and $R^6$ is hydrogen or lower alkyl.

As used herein the term "alkyl" designates a straight or branched radical having a carbon content of from 1 to about 18 carbon atoms, and the term "lower alkyl" designates a carbon content of from 1 to about 6 carbon atoms Compounds similar to those described by Formulas I, II and III have been described in various patents such as U.S. Pat. No. 3,189,630, British Pat. No. 991,591, U.S. Pat. Nos. 3,112,338 and 3,632,551. However, none of these patents reveal the unexpected and advantageous synergistic effect when titanium dioxide-pigmented polymers are blended with a compound having the Formula I as described above and either a compound selected from Formula II or Formula III as described above. Hence, the synergistic effect of the stabilizer combinations of this invention in titanium dioxide-pigmented polymers is unexpected and unpredictable.

The stabilized polymers produced in accordance with this invention can be prepared by dissolving the additive components in a suitable solvent and coating particles of the polymer with the solution followed by drying so as to remove the solvent. These particles are useful for the manufacture of shaped objects such as fibers, films, rods, tubes, molded objects, etc. Another method for preparing the stabilized polymers of this invention comprises mixing the additives into the polymer on hot mill rolls. The melt polymer can then be extruded into a shaped object such as fibers or film or other molded objects. Alternatively, the mill polymers can be granulated and used for injection molding. Other methods for incorporating the additives (stabilizing components) into polymers are self-evident to those skilled in the art.

The amounts of various additive components which can be employed depend upon the degree of stability desired, the amount of deleterious residues in the polymer to be stabilized, etc. It is considered that 5 percent by weight (sum of all stabilizing components) would be the maximum required for preventing degradation of the polymers under severe conditions. In some instances as little as 0.1 percent of each additive will be adequate to prevent visible and ultraviolet light degradation. Generally, any one of the additives should not be used in an amount greater than 10 times the weight of any other additive that may be present.

The term "polyolefin" referred to herein covers those polymers prepared by (1) polymerizing an α-monoolefin containing 2 to 12 or more carbon atoms, (2) polymerizing a mixture of α-monoolefins containing 2 to 12 carbon atoms, (3) polymerizing an α-monoolefin containing 2 to 12 carbon atoms with a diolefin including isoprene, butadiene and substituted butadiene, (4) polymerizing and α-monoolefin with acrylates, styrene, and (5) polymerizing an α-monoolefin containing 2 to 5 carbon atoms and subsequently grafting an unsaturated acid such as maleic or acrylic acid to the polymer backbone, etc. These polyolefin compositions may then be pigmented with titanium dioxide, generally in an amount of from 0.2 to about 35 percent based on the weight of the polymer. The methods of pigmenting these polymers are well known in the art and can be accomplished in the manner as described for adding the synergistic stabilizer additives to the composition. Other additives such as lubricants, slip agents, foaming agents, etc., can be used as required with no deleterious effect upon the final properties of the polymers.

The polyolefins and their copolymers of particular interest in this invention include polyethylene, polypropylene, polybutene-1, poly-4-methyl pentene-1, as well as the block- and graft-type polymers that can be prepared using one of these $C_2$ to $C_5$ α-monoolefins as the basic constituent, e.g., polypropylene graft acrylic acid and polypropylene graft maleic acid. Also within the scope of this invention are the propylene polyallomers containing ethylene, butene-1, isoprene, tetramethylbutadiene, etc. The stabilizers of this invention can be prepared by means known in the art, some of which are described in U.S. Pat. No. 3,658,910, British Pat. Nos. 1,291,536; 932,516; U.S. Pat. Nos. 3,044,217; 3,322,705; 3,368,997; British Pat. Nos. 1,001,062; 1,000,784; 1,002,432; 991,641; Canadian Pat. No. 623,724; U.S. Pat. Nos. 3,189,630; 3,549,588; 3,112,338; 3,189,630; and 3,632,551.

Examples of the stabilizers identified by Component (1), Formula I, are the zinc or manganese salts of 3,5-dialkyl-4-hydroxybenzoic acid such as manganese 3,5-di-tert-butyl-4-hydroxybenzoate, zinc 3,5-diisopropyl-4-hydroxybenzoate, manganese 3,5-di-tert-amyl-4-hydroxybenzoate, manganese 3,5-di-sec-butyl-4-hydroxybenzoate and manganese 3,5-di-cyclohexyl-4-hydroxybenzoate.

Compounds representative of those stabilizers having the Formula II include 2-hydroxybenzophenone, 2,4-dihydroxybenzophenone, 4-octyloxy-2-hydroxybenzophenone, 4-dodecyl-2-hydroxybenzophenone, 4-methoxy-2-hydroxybenzophenone, 4-octyldecyloxy-2-hydroxybenzophenone, etc.

Compounds representative of the triazoles corresponding to Formula III are as follows: 2-(2H-benzotriazol-2-yl)-4,6-di-tert-pentylphenol, 2-(2H-benzotriazol-2-yl)-p-cresol, 2-tert-butyl-6-(5-chloro-2H-benzotriazol-2-yl)-p-cresol, etc. Compounds of this type are described in U.S. Pat. Nos. 3,004,896; 3,467,482 and British Pat. No. 922,943.

The following examples further illustrate the invention.

EXAMPLES 1–18

The additives listed in the following Tables I and II are incorporated into polypropylene by hot roll compounding. Films (5 mil nominal thickness) are pressed from these compositions and exposed in a Weather-Ometer until brittle. The results of these tests are shown in Table I and II. The stabilization data are expressed as improvement factors (I.F.) defined as follows:

$$I.F. = \frac{\text{Lifetime of Stabilized Sample}}{\text{Lifetime of Unstabilized Control}}$$

TABLE I

Polypropylene Pigmented with 10% Ti-Pure 100 Titanium Dioxide

| Example | Salt of[a] | Stabilizing Additive Weight Percent | UV Absorber[b] | Weight Percent | I.F. | Color Initial | Final |
|---|---|---|---|---|---|---|---|
| 1 | None | — | None | — | 1.0 | White | White |
| 2 | None | — | 2 | 1.0 | 1.0 | White | White |
| 3 | None | — | 3 | 1.0 | 1.4 | White | White |
| 4 | $Zn^{+2}$ | 1.0 | None | — | 2.0 | White | White |
| 5 | $Mn^{+2}$ | 1.0 | None | — | 4.0 | White | White |
| 6 | $Zn^{+2}$ | 0.5 | 2 | 0.5 | 7.0 | White | White |
| 7 | $Zn^{+2}$ | 0.5 | 3 | 0.5 | >7 | White | White |
| 8 | $Zn^{+2}$ | 1.0 | 3 | 1.0 | 11 | White | White |
| 9 | $Zn^{+2}$ | 1.0 | 2 | 1.0 | 10 | White | White |
| 10 | $Mn^{+2}$ | 1.0 | 3 | 1.0 | 11 | White | White |

[a] 3,5-Di-tert-butyl-4-hydroxybenzoate.
[b] 2 = 4-Dodecyloxy-2-hydroxybenzophenone.
3 = 2,4-Di-tert-butyl-6-(5-chloro-2H-benzotriazol-2-yl)phenol.

TABLE II

Effectiveness of Metal Salts of 3,5-Di-tert-butyl-4-hydroxybenzoic Acid and Their Combinations with Ultraviolet Absorbers in Unpigmented Tenite 423DF Polypropylene

| Example | Salt of[a] | Stabilizing Additive Weight Percent | UV Absorber[b] | Weight Percent | I.F. | Color Initial | Final |
|---|---|---|---|---|---|---|---|
| 11 | None | — | None | — | 1.0 | None | None |
| 12 | None | — | 2 | 1.0 | 8.0 | None | None |

TABLE II — Continued

Effectiveness of Metal Salts of 3,5-Di-tert-butyl-4-hydroxybenzoic Acid and Their Combinations with Ultraviolet Absorbers in Unpigmented Tenite 423DF Polypropylene

| Example | Salt of[a] | Stabilizing Additive Weight Percent | UV Absorber[b] | Weight Percent | I.F. | Color Initial | Final |
|---|---|---|---|---|---|---|---|
| 13 | None | — | 3 | 1.0 | 3.1 | None | None |
| 14 | Zn$^{+2}$ | 1.0 | None | — | 1.9 | None | None |
| 15 | Mn$^{+2}$ | 1.0 | None | — | 2.1 | None | None |
| 16 | Zn$^{+2}$ | 1.0 | 2 | 1.0 | 9.0 | None | None |
| 17 | Zn$^{+2}$ | 1.0 | 3 | 1.0 | 3.0 | None | None |
| 18 | Mn$^{+2}$ | 1.0 | 3 | 1.0 | 3.7 | None | None |

[a]3,5-Di-tert-butyl-4 hydroxybenzoate.
[b]2 = 4-Dodecyloxy-2-hydroxybenzophenone.
3 = 2,4-Di-tert-butyl-6-(5-chloro-2H-benzotriazol-2-yl)phenol.

EXAMPLES 19–24

Tenite AMP 760 (registered trademark of Eastman Kodak Co.), polypropylene graft acrylic acid films containing 15 pph of titanium dioxide and 0.75 pph of Irganox 1010 (registered trademark of Ciba-Geigy Ltd.) were pressed onto aluminum plates and weathered in a Uvatest apparatus (GEOPAR Industries, Ludlow, Mass.). Air saturated with water at room temperature is passed over the samples, 60°gloss is used to monitor degradation, the results obtained are shown in the following table:

TABLE III

| Example | Additive (1% each) | Hours to 25% Reduction in 60° Gloss (ASTM D-523-67) |
|---|---|---|
| 19 | None | 570 |
| 20 | Tinuvin P* | 670 |
| 21 | Mn$^{+2}$** | 930 |
| 22 | Zn$^{+2}$** | 1500 |
| 23 | Mn$^{+2}$ + Tinuvin P | >1700 |
| 24 | Zn$^{+2}$ + Tinuvin P | >2400 |

*Registered trademark of Ciba-Geigy for 2,4-di-tert-butyl-6-(5-chloro-2H-benzotriazol-2-yl)phenol.
**3,5-Di-tert-butyl-4-hydroxybenzoate.

EXAMPLE 25

The procedures of Examples 1–25 are repeated except that polyethylene and poly-1-butene are the polyolefins utilized. Similarly advantageous results are obtained.

EXAMPLE 26

(Comparative)

A dispersed system of equimolecular amounts of dibutyltin oxide (24.9 g., 0.1 mole), 3,5-di-t-butyl-4-hydroxybenzoic acid (25.0 g.), and 2-hydroxy-4-methoxybenzophenone (22.8 g.) in 250 ml. of xylene is heated at reflux temperature for 5 hours, whereupon water is removed in the azeotrope of xylene which distilled off, and a uniform, clear solution is obtained. The xylene is then distilled off from the resulting action solution under reduced pressure at 110°C. to yield 69.5 g. of a compound of the formula

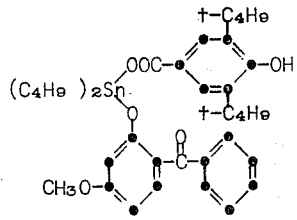

Analysis — Calc. for $C_{37}H_{50}O_6Sn$ (percent): C, 62.64; H, 7.10; Sn, 16.73. Found (percent): C, 62.36; H, 6.90; Sn, 16.62. This compound is disclosed in U.S. Pat. No. 3,632,551. The compound thus prepared is blended at 1 percent by weight in Tenite Polypropylene 423DF containing 5 percent by weight titanium dioxide. After 12 days exposure at 3,100 A and 68°C. in a reactor equipped with 3,100 A lamps, the sample becomes brittle.

A sample of Tenite Polypropylene 423DF containing 5 percent by weight titanium dioxide, 0.5 percent by weight zinc, 3,5-di-tert-butyl-4-hydroxybenzoate and 0.5 percent by weight of 4-dodecyloxy-2-hydroxybenzophenone exposed at 3,100 A and 68°C. does not become brittle for 21 days.

Although the invention has been described in considerable detail with particular reference to certain preferred embodiments thereof, variations and modifications can be effected within the spirit and scope of the invention.

We claim:

1. Composition comprising a titanium dioxide pigmented polymer normally susceptible to degradation due to visible or ultraviolet light selected from the group consisting of poly-α-olefins prepared from at least one α-monoolefin having 2 to 12 carbon atoms and graft copolymers prepared by polymerizing an α-monoolefin containing 2 to 5 carbon atoms and subsequently grafting maleic or acrylic acid to the polymer backbone; mixed with a stabilizing amount of the following components (1) and (2):
 1. a compound having the formula

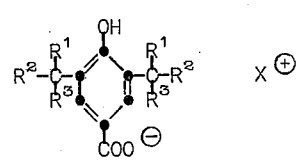

wherein $R^1$ to $R^3$ are the same or different and each represents an alkyl group having 1 to 8 carbon atoms; $X^+$ is $Mn^{+2}$or $Zn^{+2}$; and 2. a compound selected from (a) compounds having the formula:

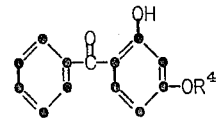

or (b) compounds of the formula:

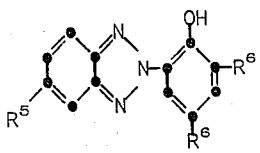

wherein R⁴ represents hydrogen or alkyl, R⁵ represents hydrogen or chloro, each R⁶ is the same or different and represents hydrogen or alkyl, each of said components being utilized in an amount of from about 0.01 to about 4.0 weight percent based on the weight of the polymer with an upper limit such that the sum of all such percentages of said components does not exceed 5 weight percent based on the weight of the polymer.

2. Composition according to claim 1 wherein the titanium dioxide-pigmented polymer is polypropylene.

3. Composition according to claim 2 wherein R¹, R² and R³ are methyl or ethyl; R⁴ is an alkyl group having eight to twelve carbon atoms; R⁶ is hydrogen or lower alkyl; and X⁺ is Zn⁺².

4. Composition of claim 1 wherein the polymer is a polypropylene graft acrylic acid.

5. Composition of claim 1 wherein the stabilizing components are zinc 3,5-di-tert-butyl-4-hydroxybenzoate and 4-dodecyloxy-2-hydroxybenzophenone.

6. Composition of claim 2 wherein the stabilizing components are zinc 3,5-di-tert-butyl-4-hydroxybenzoate and 4-dodecyloxy-2-hydroxybenzophenone.

7. Composition of claim 1 wherein the stabilizing components are zinc 3,5-di-tert-butyl-4-hydroxybenzoate and 2,4-di-tert-butyl-6-(5-chloro-2H-benzotriazol-2-yl)phenol.

8. Composition of claim 2 wherein the stabilizing components are zinc 3,5-di-tert-butyl-4-hydroxybenzoate and 2,4-di-tert-butyl-6-(5-chloro-2H-benzotriazol-2-yl)phenol.

9. Composition of claim 4 wherein the stabilizing components are zinc 3,5-di-tert-butyl-4-hydroxybenzoate and 2,4-di-tert-butyl-6-(5-chloro-2H-benzotriazol-2-yl)phenol.

* * * * *